United States Patent
Bond et al.

(10) Patent No.: US 9,232,018 B2
(45) Date of Patent: *Jan. 5, 2016

(54) SYSTEM AND METHOD OF CREATING AND RATING ITEMS FOR SOCIAL INTERACTIONS

(71) Applicant: INTERNATIONAL BUSINESS MACHINES CORPORATION, Armonk, NY (US)

(72) Inventors: Robert W. Bond, Powder Springs, GA (US); Stephen E. Jaffe, Canton, GA (US); Keith P. Loring, Milton, VT (US); Douglas J. McCulloch, Marietta, GA (US); Patrick J. Richards, Jr., Marietta, GA (US); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/936,639

(22) Filed: Jul. 8, 2013

(65) Prior Publication Data
US 2013/0297701 A1 Nov. 7, 2013

Related U.S. Application Data

(63) Continuation of application No. 13/418,944, filed on Mar. 13, 2012, now Pat. No. 8,489,621, which is a continuation of application No. 11/682,191, filed on Mar. 5, 2007, now Pat. No. 8,195,676.

(51) Int. Cl.
| H04L 29/08 | (2006.01) |
| G06Q 10/10 | (2012.01) |
| G06Q 30/02 | (2012.01) |

(52) U.S. Cl.
CPC ............ *H04L 67/306* (2013.01); *G06Q 10/107* (2013.01); *G06Q 30/02* (2013.01)

(58) Field of Classification Search
CPC ..... G06Q 10/107; G06Q 30/02; H04L 67/306
USPC ......................................... 707/752
See application file for complete search history.

(56) References Cited

U.S. PATENT DOCUMENTS

| 5,835,087 A | 11/1998 | Herz et al. |
| 7,085,745 B2 | 8/2006 | Klug |
| 7,092,508 B2 | 8/2006 | Brown et al. |
| 7,143,089 B2 | 11/2006 | Petras et al. |
| 7,143,135 B2 | 11/2006 | Smith et al. |
| 7,149,288 B2 | 12/2006 | Digate et al. |
| 7,171,423 B2 | 1/2007 | Nishikawa et al. |
| 2002/0065897 A1 | 5/2002 | Voticky et al. |
| 2002/0120702 A1 | 8/2002 | Schiavone et al. |
| 2004/0230572 A1 | 11/2004 | Omoigui |
| 2005/0091155 A1 | 4/2005 | Pokta |
| 2005/0149498 A1 | 7/2005 | Lawrence et al. |
| 2006/0242574 A1 | 10/2006 | Richardson et al. |
| 2007/0244750 A1 | 10/2007 | Grannan et al. |
| 2008/0059419 A1 | 3/2008 | Auerbach et al. |

Primary Examiner — Huawen Peng
(74) Attorney, Agent, or Firm — Matthew Chung; Roberts Mlotkowski Safran & Cole, P.C.

(57) ABSTRACT

A system and method for providing items to users and, more particularly, a system and method for rating items and placing such items into a queued list. The method includes providing an item from a web browser to a recipient on a preferred list and placing the item into a queued list with respect to other items based on a rating. The system includes a computer infrastructure being operable to provide a rated item from a web browser to a recipient on a preferred list and place the rated item in a queued list with respect to other items.

8 Claims, 10 Drawing Sheets

SYSTEM AND METHOD OF CREATING AND RATING ITEMS FOR SOCIAL INTERACTIONS

FIELD OF THE INVENTION

The invention generally relates to a system and method for providing items to users and, more particularly, the invention relates to a system and method for rating items and providing such items into a queued list.

BACKGROUND OF THE INVENTION

Technology is ubiquitous in modern life, often taking the place of human interaction. For example, computing networks such as instant messaging, email, blogs, etc. have begun to supplant face to face interactions between people. Often this has the advantage of increasing productivity and efficiency; but this may be to the detriment of other attributes.

Thus, although email, instant messaging and other technologies have their advantages, they cannot replace a friendly chat or conversation where the persons involved are more likely to share each other's interests, etc. As such, it is not uncommon for conversations to typically delve deeper into every day life events and topics such as the interests of the people, current events, and daily life topics, all of which make such conversation more productive than communicating in an impersonal manner such as by electronic means.

So, with social interactions, it is possible to more readily discern your colleagues' interests at work, what they are reading or have read and other interests and details, in real time. All of these things may be of interest to you, which would otherwise be difficult to ascertain in the more impersonal email. In the case of the work environment, these topics may allow each person to stay current in work topics, and even incite workplace discussion and collaboration.

Accordingly, there exists a need in the art to overcome the deficiencies and limitations described hereinabove.

SUMMARY OF THE INVENTION

In a first aspect of the invention, a method comprises providing a rated item from a web browser to a recipient on a preferred list and placing the rated item into a queued list with respect to other items based on the rating.

In another aspect of the invention, a system for deploying an application in a computing environment comprises a computer infrastructure operable to provide a rated item from a web browser to a recipient on a preferred list. The computer infrastructure is also operable to place the rated item in a queued list with respect to other items.

In another aspect of the invention, a computer program product comprising a computer usable medium having readable program code embodied in the medium is provided. The computer program product includes at least one component to perform the steps of the invention. For example, the computer program product includes at least one component to provide an item from a web browser to a recipient on a preferred list or receive an item from the web browser upon activation of a mechanism which links a URL of the item. The item is one of a link from a browser page or a link to the browser page. The at least one component also places the item into a queued list on a recipient's display with respect to other items based on at least a score provided by a sender of the item.

In another aspect, a method for deploying an application in a computing environment, comprising a computer infrastructure being operable to: providing a rated item from a web browser to a recipient on a preferred list; and placing the rated item into a queued list with respect to other items based on the rating.

DETAILED DESCRIPTION OF EMBODIMENTS OF THE INVENTION

The invention generally relates to a system and method for providing items to users and, more particularly, the invention relates to a system and method for rating items and providing such items into a queued list based on the ratings. In use, the system and method of the invention is configured to send items such as articles, websites, documents, feeds, etc. (hereinafter referred generally as "items") to preferred users via an instant messaging system or email system. In embodiments, the system and method of the invention can be implemented over any distributed network, for example, and any existing instant messaging or email program can be modified to take advantage of the benefits and functionality of the system and method of the invention.

In implementation, the system and method allows items to be scored by the sender, prior to it being sent. Once the item is sent, it is organized into a queued list. In embodiments, the item may be placed, automatically, in certain locations in the queued list, depending on many factors. These factors may include, but are not limited to, for example, the score as assigned by the sender, a weight assigned to the sender, the number of times the item has been sent to the recipient (client), the number of times the item has been read by other users, etc. These factors alone or in any combination make up a rating, which is used by the system and method of the invention to place the item in a certain location in the queued list, with respect to other items.

In one example, the item can be placed directly at the top of the queued list if it is rated higher than all other items already within the list. In other options, the item can be time stamped such that upon expiration, without having yet been opened or read, the item will automatically be deleted from the queued list. In either of these situations, the system and method of the invention will automatically resort the list, depending on the factors and circumstances as described herein. The system and method of the invention also provides a mechanism configured to send "favorite friends" (e.g., a preferred user or group of users which are provided in an address book of an email or instant messaging program) a website or link which is being viewed in a browser by the sender, in addition to other features described herein.

System Environment

Figure 1:
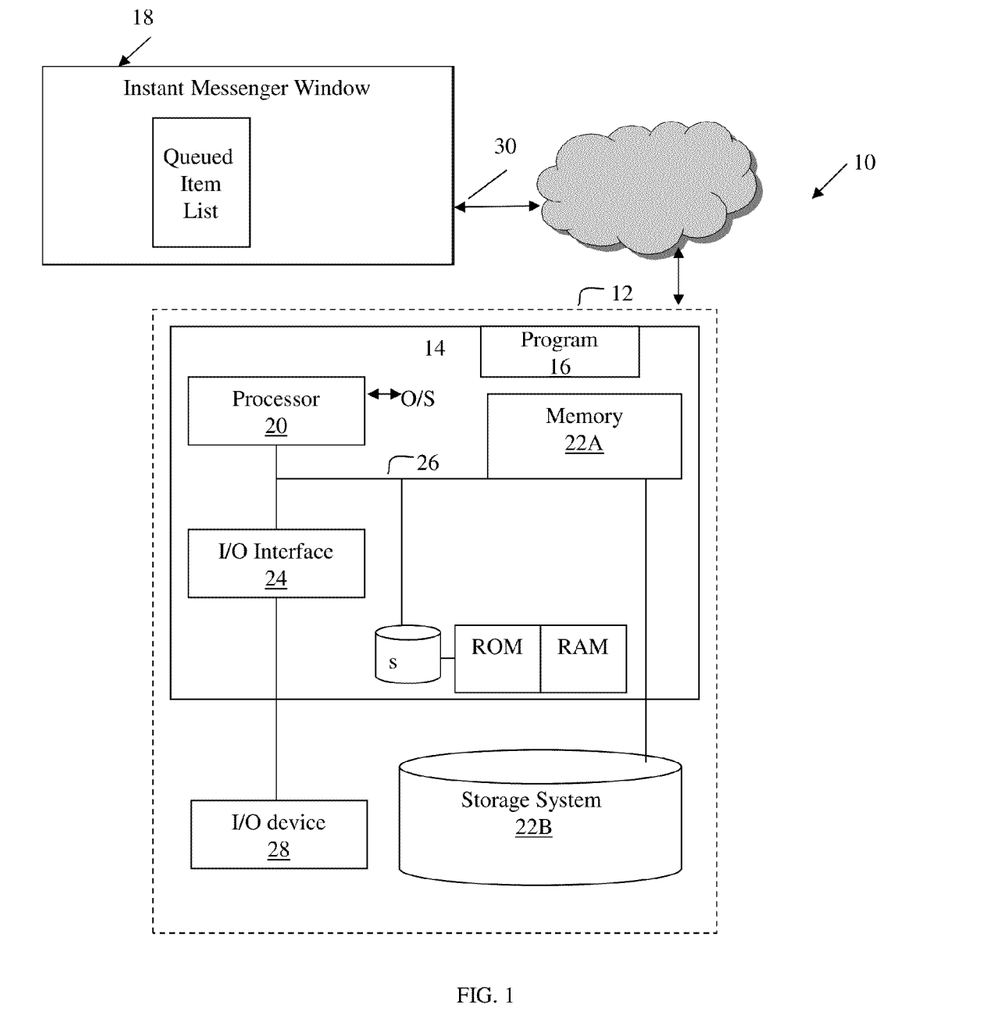
FIG. 1 shows an illustrative environment for implementing the steps in accordance with the invention.

FIG. 1 shows an illustrative environment 10 for managing the processes in accordance with the invention. The illustrative environment may be a server or a user workstation, for example, and may represent both a local system and a remote system implementing the processes of the invention. In one preferred embodiment, the illustrative environment is implemented on any personal computer or server based system using any known operating system.

The environment includes computer infrastructure 12 having computing device 14 (e.g., including instant messaging system 18). More specifically, computing device 14 includes program 16 which is configured and structured to, amongst other features, queue items into certain locations within a queued list based on factors such as, for example, the score of the item, a weight assigned to the sender, the number of times the item has been sent to the recipient, the number of times the item has been read by other users, etc. In this manner, it is possible to organize the item in a certain order based on an importance scale. Additionally, in further embodiments, program 16 includes executable code, which may be stored temporarily or permanently in memory 22A. As should be understood by those of skill in the art, the executable code can be configured to implement the above functions.

In examples, the list of items provided in instant message window 18, can be sent using any known protocol such as, for example, RSS. RSS is a family of web feed formats used to publish frequently updated digital content, such as blogs, news feeds or podcasts. As is known by those of skill in the art, "RSS" is variously used to refer to the following standards: Really Simple Syndication (RSS 2.0); Rich Site Summary (RSS 0.91, RSS 1.0); and/or RDF Site Summary (RSS 0.9 and 1.0). RSS formats are specified in XML (a generic specification for data formats). RSS delivers its information as an XML file called an "RSS feed", "webfeed", "RSS stream", or "RSS channel".

Still referring to FIG. 1, memory 22A can include local memory employed during actual execution of program code, bulk storage, and cache memories which provide temporary storage of at least some program to reduce the number of times code must be retrieved from bulk storage during execution. Computer infrastructure 12 further includes processor 20, input/output (I/O) interface 24, bus 26, Storage "S", ROM, RAM and external I/O device/resource 28.

External I/O device/resource 28 may be a keyboard, display, pointing device, or any device that enables computer infrastructure 12 to communicate with one or more other computing devices using any type of communications link 30. Communications link 30 can be, for example, wired and/or wireless links; one or more types of networks (e.g., the Internet, a wide area network, a local area network, a virtual private network, etc.); and/or any known transmission techniques and protocols such as, for example, TCP/IP. Processor 20 executes the computer program code and logic of the system and method of the invention, which is stored in memory 22A. While executing the computer program code, etc., processor 20 can read and/or write data to/from memory 22A, storage system 22B, and/or I/O interface 24. Bus 26 provides a communications link between each of the components in computing device 14.

Exemplary Graphical User Displays Implementing Aspects of the Invention

Figure 2A:
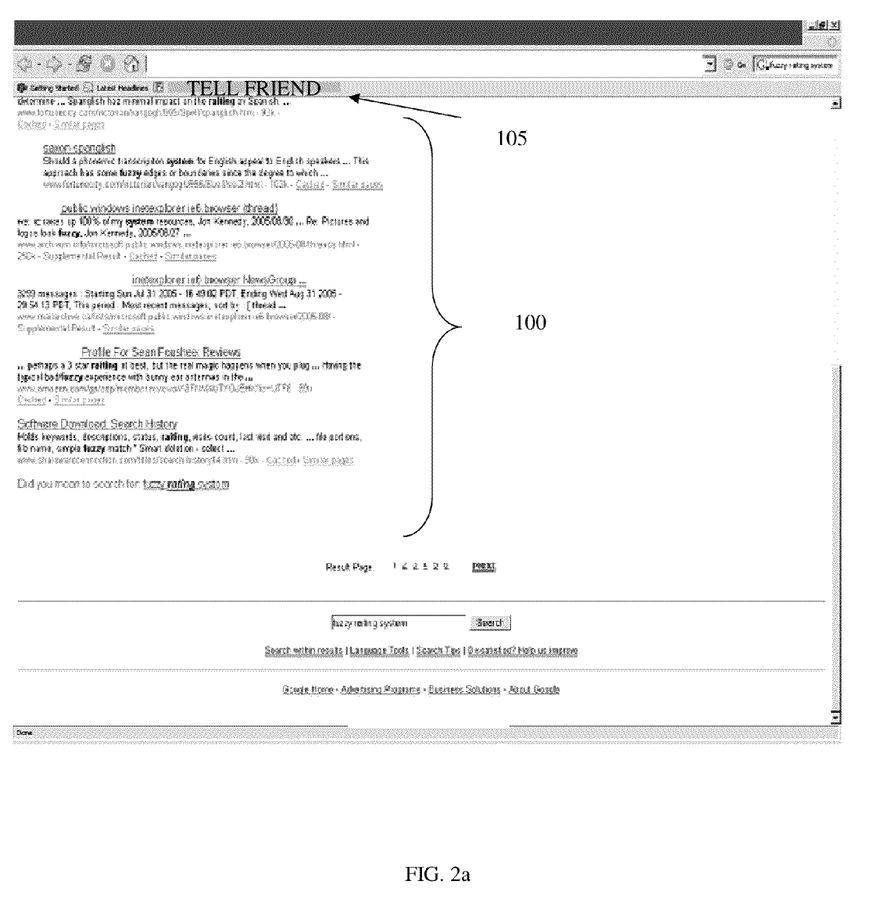
FIG. 2a shows an exemplary graphical user display in accordance with an aspect of the invention.
Figure 2B:
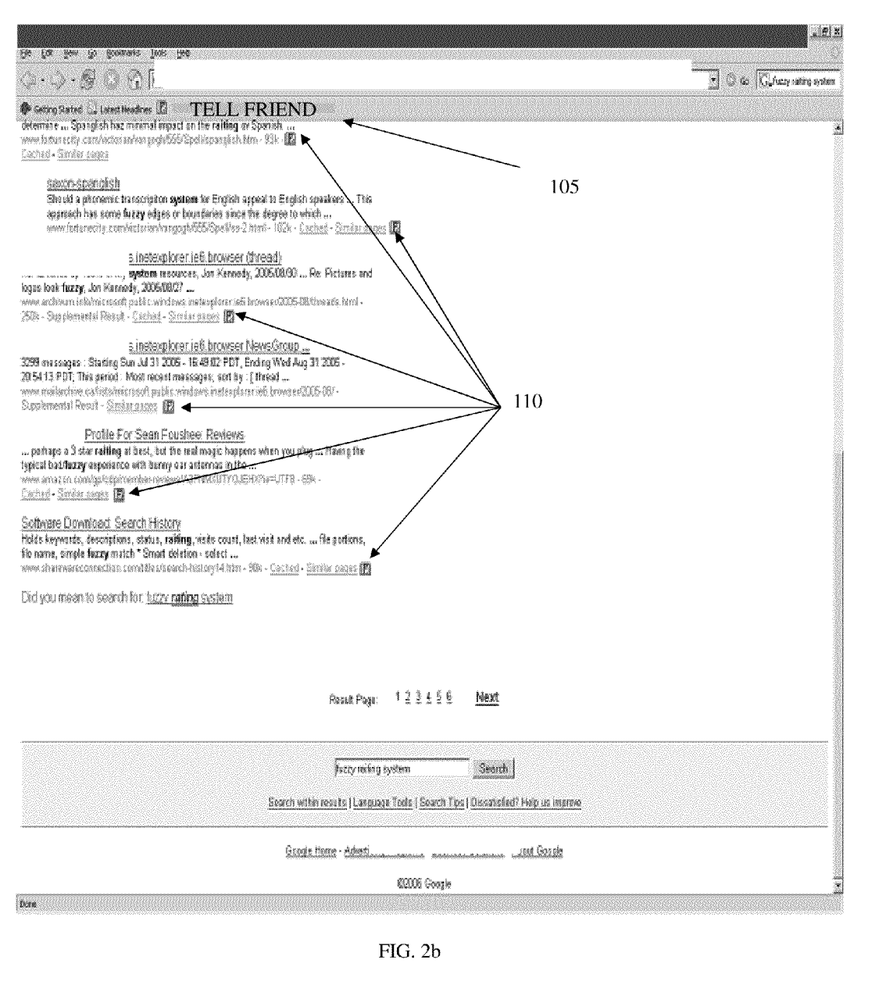
FIG. 2b shows an exemplary graphical user display in accordance with an aspect of the invention.
Figure 3:
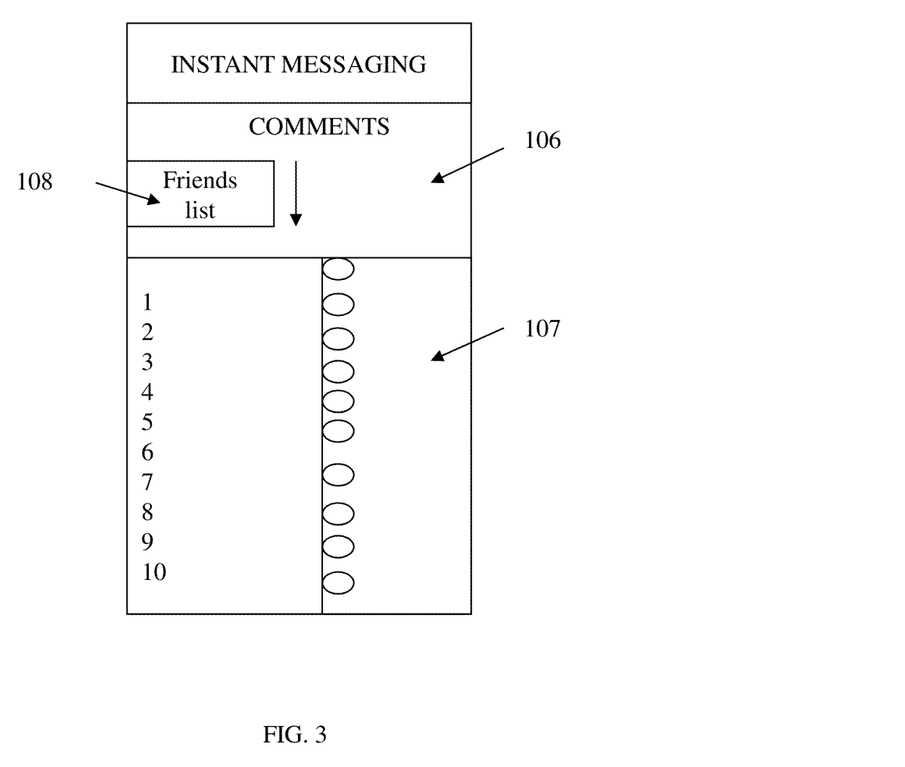
FIG. 3 shows an instant messaging screen in accordance with an aspect of the invention.

FIGS. 2a-3 show exemplary graphical user displays in accordance with aspects of the invention. The representative graphical user display of FIG. 2a is a browser showing several different items 100. The representative graphical user display further shows "tell a friend" button 105 which, when activated, copies the link of the page and brings up a window (shown in FIG. 3) that allows a user to fill in comments and score or rate the page.

More particularly, FIG. 3 shows a screen (dialog box) having comment area 106 and scoring area 107, both of which can be completed by the user (sender). In one illustrative, non-limiting, example, the item can be score from "1" to "10", with "10" being of the highest importance. In addition, drop down menu 108 is provided which lists friends, individually or as groups, depending on the preference of the user. Drop down menu 108 is basically an address list which allows the user to send the item to a friend, a group of friends, or other persons wanting to know what the user is reading, for example.

FIG. 2b shows a variation of FIG. 2a. In this implementation, the system and method of the invention searches the browser page for links and places a "tell a friend" icon or marker 110 by each link. By clicking "tell a friend" icon 110, the screen (dialog box) of FIG. 3 will automatically appear. Similar to above, the user can now score the item, make comments and send the link with the comments and score to an individual or group, depending on the preference of the user.

As a further alternative to FIG. 2a or 2b, the user can provide a custom link (e.g., a description of the link, much like a hyperlink description) in the dialog box of FIG. 3. This may be accomplished, by one example, in comment area 106. This custom link may be in lieu of the predefined link shown in FIG. 2b.

Figure 4:
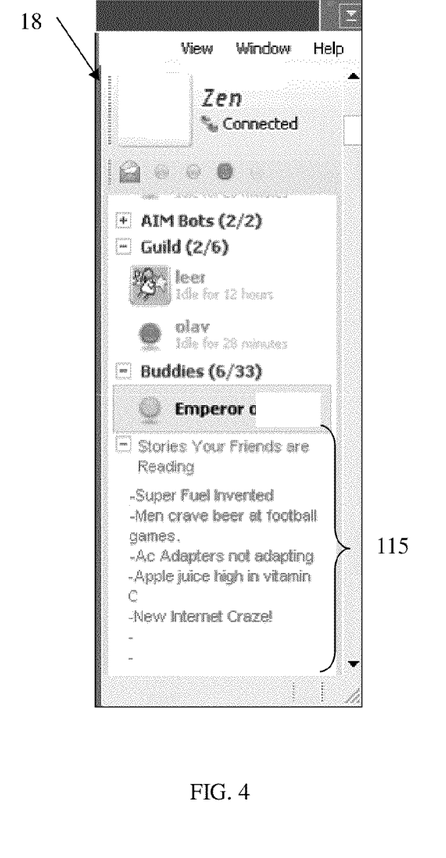
FIGS. 4 and 5 show different exemplary graphical user displays representative of an instant messaging system in accordance with aspects of the invention.
Figure 5:
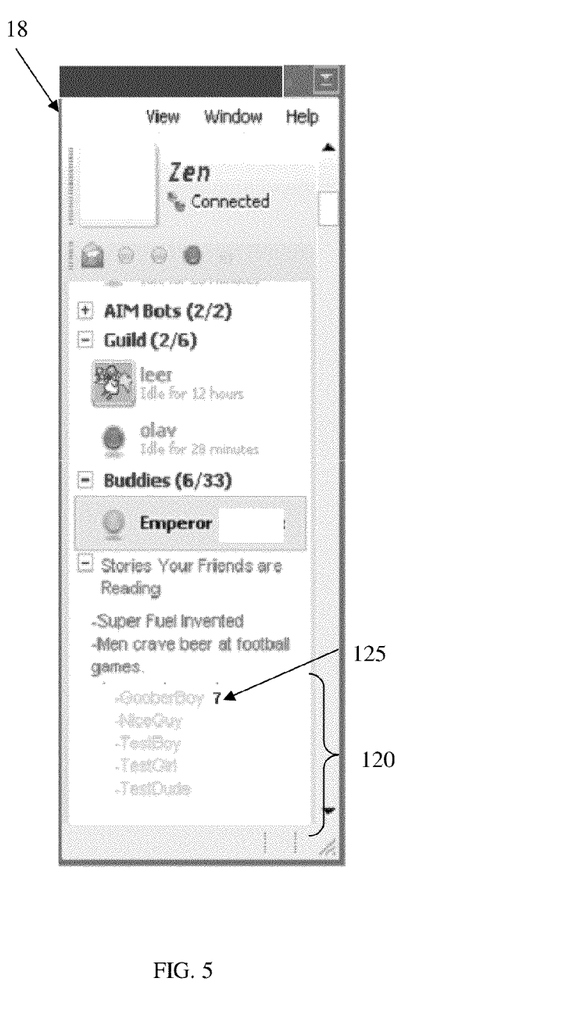

FIGS. 4 and 5 show different exemplary graphical user displays representative of an instant messaging system in accordance with aspects of the invention. Once a link is sent to a friend or group of friends, the link or item may appear in the recipient's instant messenger, as is shown in FIGS. 4 and 5.

In the example of FIG. 4, items 115 may be placed in a queue based on the factors described herein. For example, the "super fuel invented" item may be the first listed item based on a score given by the sender, the number of times it was sent to the recipient, etc. Also, as described herein, the item may have a higher importance in the queued list (e.g., move up in the list), automatically, as more users in the recipient's friends list have read the item. Also, it is contemplated by the present invention that when a user reads the item, they can send the item to other friends in one of their groups, and remove the item from the list.

In embodiments, the item may move up in the queued list as more users read the item. In this manner, the system and method of the invention may push information associated with the item along the chain of friends. By way of example, if user 1 sends the item to recipients 2-10, and each of the recipients 2-9 have read the item, then the item may be placed higher in the queue for recipient 10 and any subsequent recipients of the item.

In the example of FIG. 5, the representative graphical user display shows a list of "friends" (other users) 120 which have previously read the item, or in the least sent the item to the recipient. The graphical user display may additionally include a score 125, providing by any of "friends" (other users) 120. In the example of FIG. 5, "gooberboy" provided a score of 7. As described herein, the rating will be used by the system and method of the invention to place the item in a certain location within the list with respect to other items, in this case at the top of the list. In this example, clicking on user 120 will bring up a popup that describes any comments the user may have made which are stored in the description tag of the RSS XML.

As described herein, the rating which may include one or more of the several factors will be used by the system and method of the invention to place the item in a certain location within the list with respect to other items. The item may be provided a higher importance, and hence moved within the list accordingly, based on a weight assigned to the sender by the recipient (e.g., a higher weight may be given to a preferred sender). Also, the item may be moved within the list based on the amount of time it was read by other users, the amount of times it was sent to the recipient, or a combination of any of the above factors. In the example of a combination of factors, the system and method may place different importance on different factors. By way of example, the score and weighting may be multiplied together to provide a very high importance, relative to other combinations such as, for example, an amount of times the item has been sent or read by other users.

In the examples described herein, the system and method of the invention leverages the RSS 2.0 XML standard, but can be easily adapted to a <2.0 standard. By way of example to generate the representative graphical user displays of FIGS. 4 and/or 5, the XML may be written as follows:

```
<?xml version="1.0"?>
<rss version="2.0">
<channel>
<title>WebSite name Story Name</title>
<link>http://liftoff.msfc.nasa.gov/</link>
<description>I liked this article</description>
<language>en-us</language>
<pubDate>Tue, 10 Jun 2003 04:00:00 GMT</pubDate>
<docs>http://blogs.law.harvard.edu/tech/rss</docs>
<generator>TREX</generator>
<author> John Doe</author>
<IMName>Emperor of Linux</IMNAme>
<Score> 8 </score>
</channel>
</rss>
```

In this example, the "<description>I liked this article</description>" may be the comments provided by the sender or, alternatively, a description of the link. The "<docs>http://blogslaw.harvard.edu/tech/rss</docs>" may be the description of the document; whereas, the "<title>WebSite name Story Name</title>" and "<link>http://liftoff.msfc.nasa.gov/</link>" are the title of the item and respective hyperlink. The "<IMName>Emperor of Linux</IMNAme>" is the name of the sender and the "<Score>8</score>" is the score provided by the sender. In embodiments, the system and method of the invention checks the instant messenger for the name of the sender to add as the "IMName". The IMName may be associated with a weight provided by the recipient in order to rate the item based on the importance that the recipient has placed on the sender. The system checks for all users in the instant message group and sends a message to each person in the group.

Flow Diagram Implementing Steps of the Invention

FIGS. 6-9 represent flow diagrams implementing steps of various embodiments of the invention. The steps of FIGS. 6-9 may be implemented in the environment of FIG. 1, using the graphical displays of FIGS. 2*a*-5, and implemented, in practice using the graphical displays of FIGS. 6-9. The steps of the invention may equally represent a high-level block diagram of the invention.

The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Sorting Items

Figure 6:
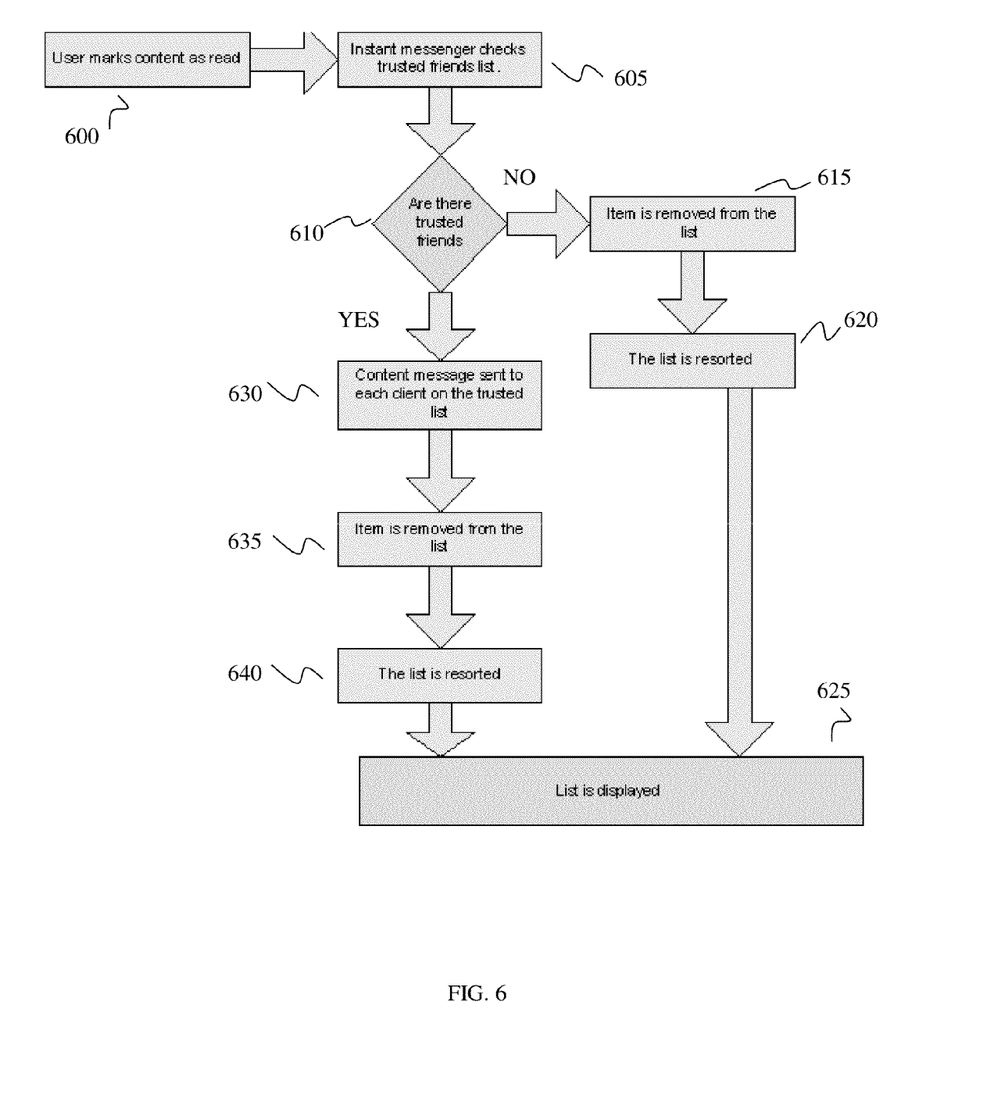
FIGS. 6-9 show various flow diagrams implementing steps in accordance with the invention.

FIG. 6 shows exemplary steps that are implemented after a recipient (client) receives a message (item). More specifically, at step 600, the process marks the item (e.g., content document, article, URL, etc.) as read by the recipient. This may be performed manually by the recipient after the content has been read, or alternatively, automatically by the process of the invention (e.g., after the item has been closed). At step 605, the process checks the "trusted friends" list.

At step 610, a determination is made as to whether there are any "trusted friends." If there are no "trusted friends", the process removes the item from the queued list at step 615 and, at step 620, resorts the list. At step 625, the resorted list is displayed. As discussed herein, the item list may be resorted based on one or more factors such as, for example, scores given by a trusted friend, a weighting assigned to the trusted friend, as well as how many times the item was read by any of the trusted friends or others.

At step 630, if there are "trusted friends", a message with the item is sent to each of the selected "trusted friends". The item is then removed from the queued list (of the client) at step 635 and, at step 640, the list is resorted. Steps 615 and 620 and steps 635 and 640 can be combined, respectively, into two steps. It should be understood that the sent item is placed in the queued list of the trusted friend.

Resorting List Based Existing Items

Figure 7:
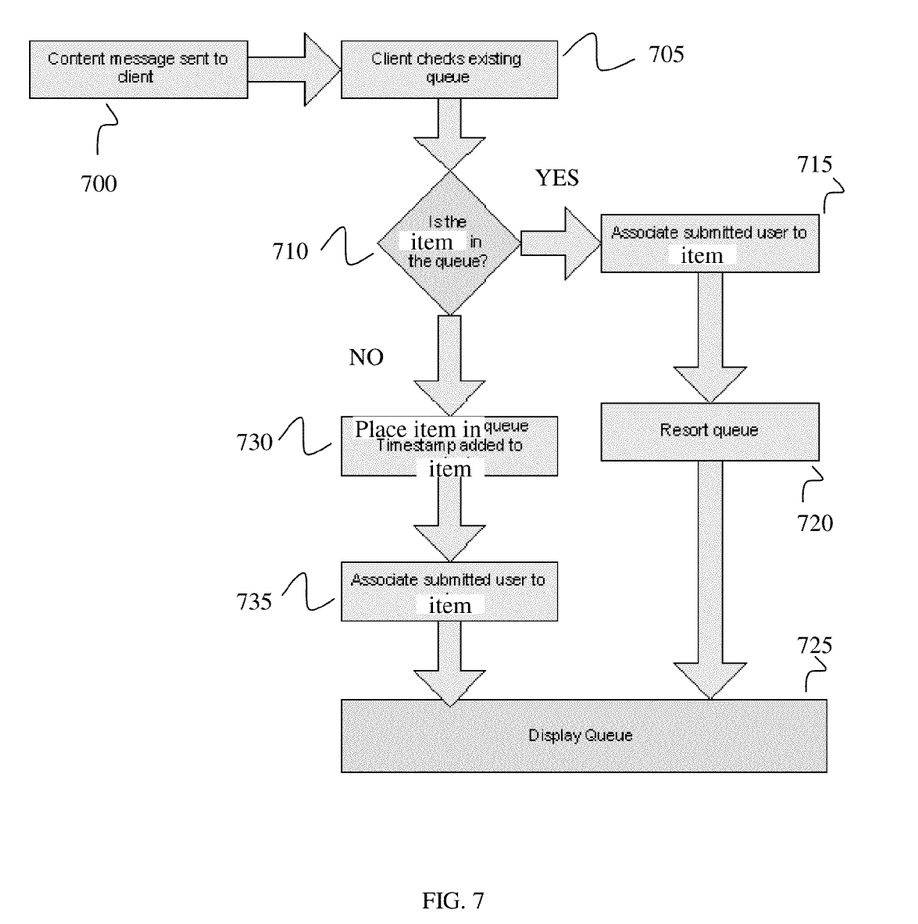

FIG. 7 shows exemplary steps for resorting the queued list if an existing item has been sent to the client from another external user. In this exemplary illustration, the existing item is associated with the new submission, via an URL, for example. In the case that the URL is the same, it is assumed that the content is also the same.

As discussed in further detail below, if there is an existing item that has been sent to the recipient from an additional external user then the system and method will associate the new item with the item already in the queue, and resort the queue based on occurrences and other factors described herein. More specifically, at step 700, a content message is sent to the recipient (e.g., received by the client). At step 705, the client system (e.g., process) checks the existing queue to make a determination as to whether the sent item matches an item already in the list. The process may make the determination by matching URLs, at step 710.

If there are matching URLs, for example, at step 715, the process associates the submitting user to the item. In this step, it is possible to also determine if any weighting has been assigned to the sender, for example, which may affect the resorting order. At step 720, the list is resorted. Again, the resorting of the queued items may be based on any combination of factors such as, for example, a score provided by the user, an assigned weight associated with the submitting user, as well as how many times this same item was received by the client and/or read by others.

If the submitted item is not in the queued list then, at step 730, the item is placed in the queue, again based on any combination of factors discussed herein. In optional embodiments, the item may be time-stamped. At step 735, the process associates the submitting user to the item, which may be used, in optional embodiments, to weight the item. At step 725, the list is displayed to the recipient.

Expiring Content/Items

Figure 8:
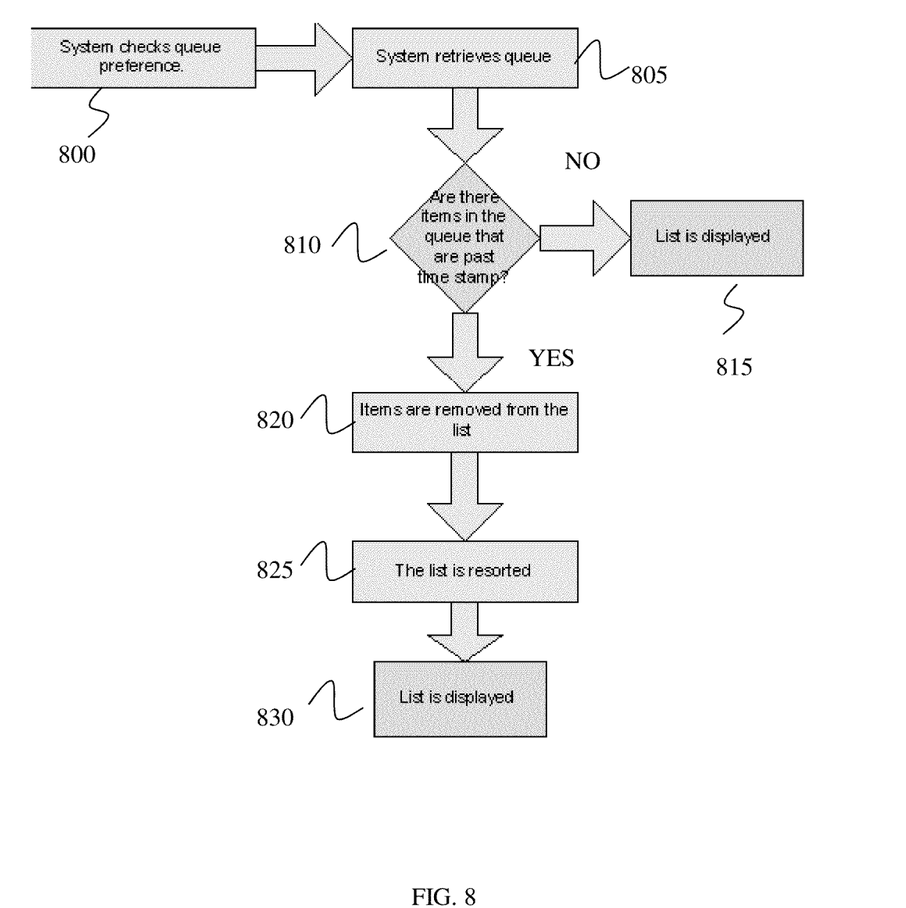

FIG. 8 shows exemplary steps of expiring content in the list. More specifically, at step 800, the process checks the queue preference, e.g., when an item should expire based on preferences of the recipient. At step 805, the process retrieves the queue. At step 810, the process determines whether there are items in the queue that are listed for more than a predetermined amount of time. The starting time may be based on a time stamp given to the item when originally placed in the queue. At step 815, all items remain in the queued list which have not "expired" (e.g., are not in the queue past the predetermined amount of time). At step 820, all expired items are removed from the list. At step 825, the list is resorted and, at step 830, the newly resorted list is displayed.

Providing Statistical Information

Figure 9:
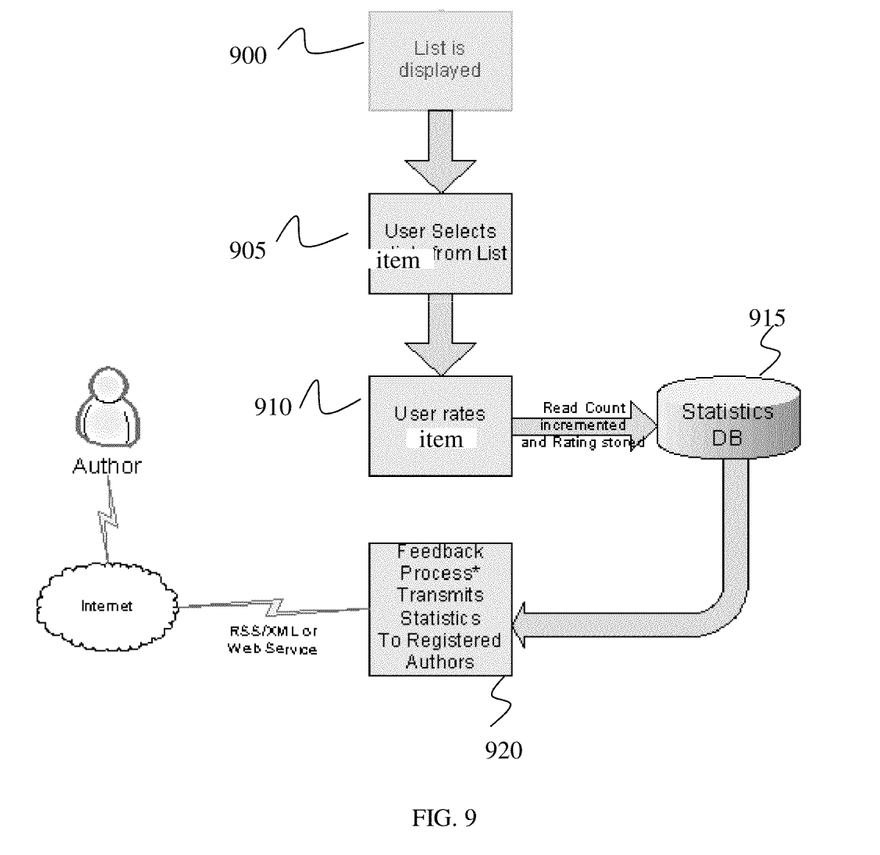

FIG. 9 shows exemplary steps which represent items being placed in a statistical database for future retrieval by an originator (author) of the item (e.g., article), for users posting items and/or clients. By way of example, when a user rates the item, the originator of the content can view the ratings for the item by querying a database.

More specifically, at step 900, a list is displayed to the user. In this embodiment, the user may be the sender or recipient or other type of user. At step 905, the user selects the item from the list. At step 910, the user scores the item. At step 915, the score (and any tabulated rating) is stored in a database at which time other statistical information may be tabulated such as, for example, read count, etc. At step 920, the process transmits the statistical information, which may include the scores provided by the user, to the originator via an RSS/XML or web service. In embodiments, the originator, client, user, etc. may obtain this statistical information by logging onto the web or other service using a password, screen name, etc.

As such, in this optional embodiment, the user may use a publish all option that sends a message to the database and informs an instant messenger or other communication mechanism of another user of a rating or other information about the item. In embodiments, the instant messenger system can be configured to check the user's list of people who want to see what the user publicly has read and thereafter automatically send an instant message to each of those people with an IM alias of the original user.

Additional Exemplary Graphical Display

Figure 10:
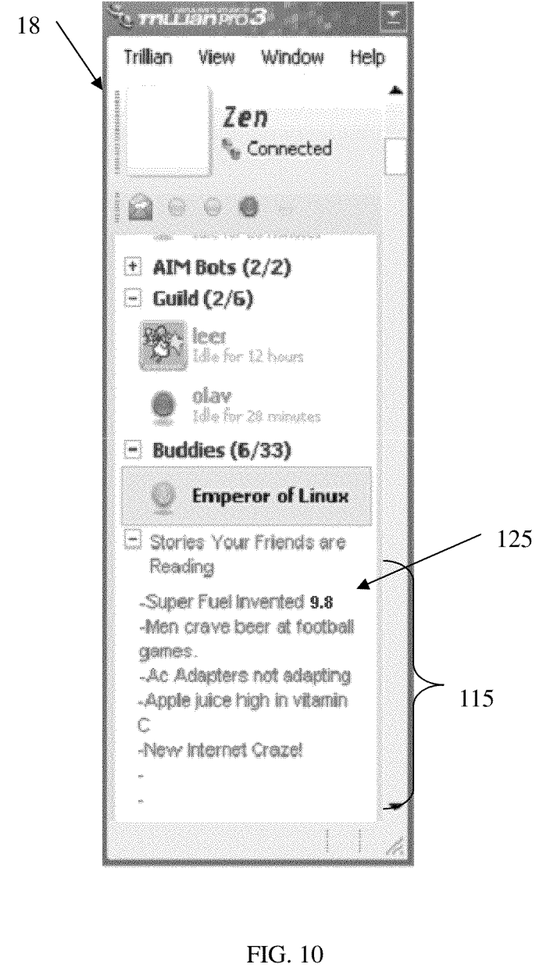
FIG. 10 shows an additional exemplary graphical user display representative of an instant messaging system in accordance with aspects of the invention.

FIG. 10 shows an exemplary graphical display of an application using the system and method of the invention. The exemplary graphical display of FIG. 10 is representative of a display showing a rating of the item, using the statistical model described with reference to FIG. 9. In this example, rating 125 is provided near item 115, which has been scored by one or more users. Alternatively, the exemplary graphical display of FIG. 10 may be a recipient's instant messenger dialogue which is discussed with reference to the database of FIG. 9.

While the invention has been described in terms of embodiments, those skilled in the art will recognize that the invention can be practiced with modifications and in the spirit and scope of the appended claims.

What is claimed is:

1. A method comprising:
receiving at least one rated item of interest from a user; and
placing the at least one rated item of interest into a queued list with respect to existing items already in the queued list,
wherein the placing of the at least one rated item of interest into the queued list comprises:
comparing the at least one rated item of interest to the existing items already in the queued list;
determining one of: the at least one rated item of interest is the same as any of the existing items, and the at least one rated item of interest is different from the existing items;
when the at least one rated item of interest is determined as the same as any of the existing items, resorting the queued list to reflect that the at least one rated item of interest has been received at least one additional time; and
when the at least one rated item of interest is determined as different from the existing items, resorting the queued list to include the at least one rated item based on a rating of the at least one rated item; and
wherein at least the step of the placing of the at least one rated item of interest into the queued list is performed using a processor of a computing device,
wherein the at least one additional time is a number of times that the at least one rated item was sent to at least one recipient,
wherein when the at least one rated item of interest is determined as the same as any of the existing items, resorting the queued list to reflect a combination of factors and that the at least one rated item of interest has been received the at least one additional time.
wherein when the at least one rated item of interest is determined as different from the existing items, resorting the queued list to include the at least one rated item based on the combination of factors and the rating of the at least one rated item, and wherein the combination factors include a weight assigned to the user.

2. The method of claim 1, wherein the combination factors include a number of times the at least one rated item of interest has been read by other users.

3. A method comprising:

receiving at least one rated item of interest from a user on a computing device of a recipient;

placing the at least one rated item of interest into a queued list with respect to existing items already in the queued list;

analyzing a contacts list of the recipient to determine whether the contacts list includes any friends;

when the contacts list does not include any friends, removing the at least one rated item of interest from the queued list and resorting the queued list; and when the contacts list does include friends, sending a message with the at least one rated item of interest to at least one of the friends in the contacts list, removing the at least one rated item of interest from the queued list, and resorting the queued list, wherein the resorting the queued list comprises resorting existing items already in the queued list based on a combination of factors including a number of times that each of the existing items was received by the recipient, and wherein the combination of factors further includes a weight assigned to a sender for each of the existing items received by the recipient and a number of times each of the existing items has been read by other users.

4. The method of claim 3, further comprising marking the at least one rated item of interest as being read by the recipient, wherein the resorting the queued list comprises resorting existing items already in the queued list, which have not been marked as being read, based on at least a number of times that each of the existing items was received by the recipient.

5. The method of claim 4, wherein the marking the at least one rated item of interest as being read by the recipient includes determining whether the at least one item of interest has been closed on the computing device of the recipient.

6. A computer system comprising:

a CPU, a computer readable memory and a computer readable storage media;

program instructions to receive at least one rated item of interest from a user;

program instructions to place the at least one rated item of interest into a queued list with respect to existing items already in the queued list;

program instructions to analyze a contacts list of a recipient to determine whether the contacts list includes any friends;

program instructions to remove the at least one rated item of interest from the queued list and resort the queued list when the contacts list does not include any friends; and program instructions to send a message with the at least one rated item of interest to at least one of the friends in the contacts list, remove the at least one rated item of interest from the queued list, and resort the queued list, when the contacts list does include friends, wherein the program instructions are stored on the computer readable storage media for execution by the CPU via the computer readable memory, wherein the resorting the queued list comprises resorting existing items already in the queued list based on at least a number of times that each of the existing items was received by the recipient, and wherein the resorting is further based on a weight assigned to a sender for each of the existing items received by the recipient and a number of times each of the existing items has been read by other users.

7. The system of claim 6, further comprising program instructions to mark the at least one rated item of interest as being read by the recipient, wherein the resorting the queued list comprises resorting existing items already in the queued list, which have not been marked as being read, based at least on a number of times that each of the existing items was received by the recipient.

8. The method of claim 7, wherein the marking the at least one rated item of interest as being read by the recipient includes determining whether the at least one item of interest has been closed on the computer system.

* * * * *